United States Patent [19]
Matile et al.

[11] Patent Number: 6,111,218
[45] Date of Patent: Aug. 29, 2000

[54] MODULATED SPRAY MIG WELDING PROCESS AND DEVICE

[75] Inventors: Olivier Matile, Paris; Gérard Plottier, Pierrefitte, both of France

[73] Assignee: La Soudure Autogene Francaise, Paris, France

[21] Appl. No.: 09/166,922

[22] Filed: Oct. 6, 1998

[30] Foreign Application Priority Data

Oct. 16, 1997 [FR] France ................................. 97 12975

[51] Int. Cl.⁷ .................................................. B23K 9/09
[52] U.S. Cl. .......................... 219/137 PS; 219/130.51; 219/137 WM
[58] Field of Search ................ 219/137 PS, 130.51, 219/137 WM

[56] References Cited

U.S. PATENT DOCUMENTS

| | | | |
|---|---|---|---|
| 3,528,100 | 9/1970 | Budy | 219/130.51 |
| 3,956,610 | 5/1976 | Kanbe et al. | 219/137 PS |
| 4,366,362 | 12/1982 | Ohta et al. | |
| 4,912,299 | 3/1990 | Oros et al. | 219/137 PS |
| 5,192,851 | 3/1993 | James et al. | 219/130.51 |
| 5,432,317 | 7/1995 | Church | 219/137 PS |
| 5,672,286 | 9/1997 | Seeds | 219/137 PS |

FOREIGN PATENT DOCUMENTS 0 422 763   4/1991   European Pat. Off.
56-134075  10/1981   Japan.

*Primary Examiner*—Clifford C. Shaw
*Attorney, Agent, or Firm*—Young & Thompson

[57] ABSTRACT

A process and a device for the gas-shielded MIG welding in modulated-spray mode, of aluminum, particularly aluminum alloys, or stainless steels, in which the current is modulated at a modulation frequency of less than 60 Hz. The shielding gas contains at least 90% helium, argon or a mixture thereof and at most 1.95% of at least one minor gaseous component chosen from oxygen and carbon dioxide. This process allows effective degassing of most of the diffusible hydrogen liable to be found in the pool of molten metal and improves the appearance and quality of the weld beads thus produced on workpieces or equipment intended for the rail, sea, air, road or space transport industry or for the chemical, petrochemical, electronic, nuclear or agrochemical industries.

20 Claims, 6 Drawing Sheets

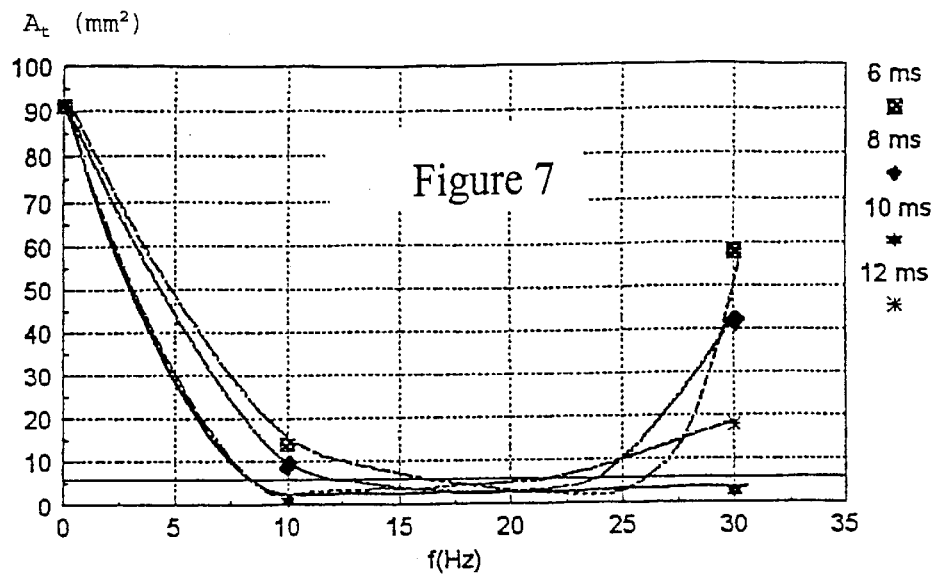
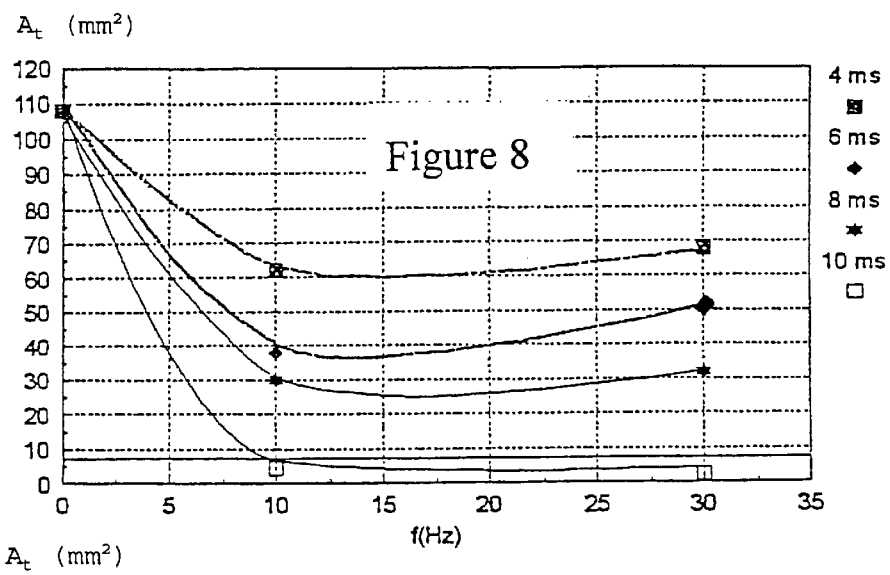
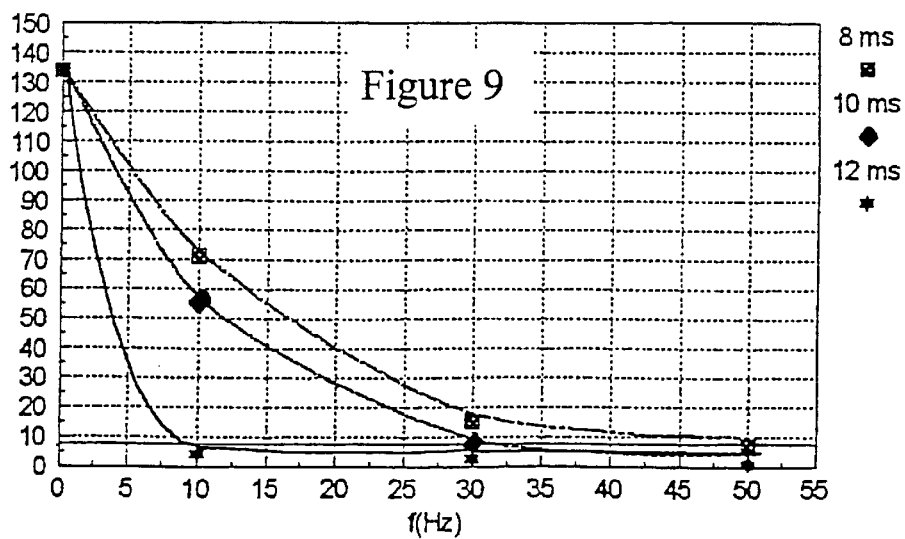

Figure 12
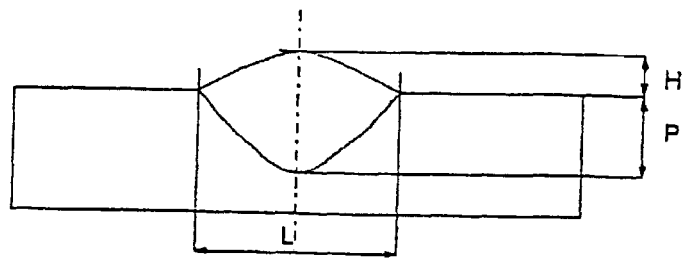
Figure 12a
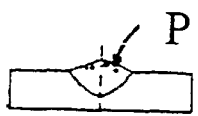
Figure 12b
Figure 12c
Figure 12d
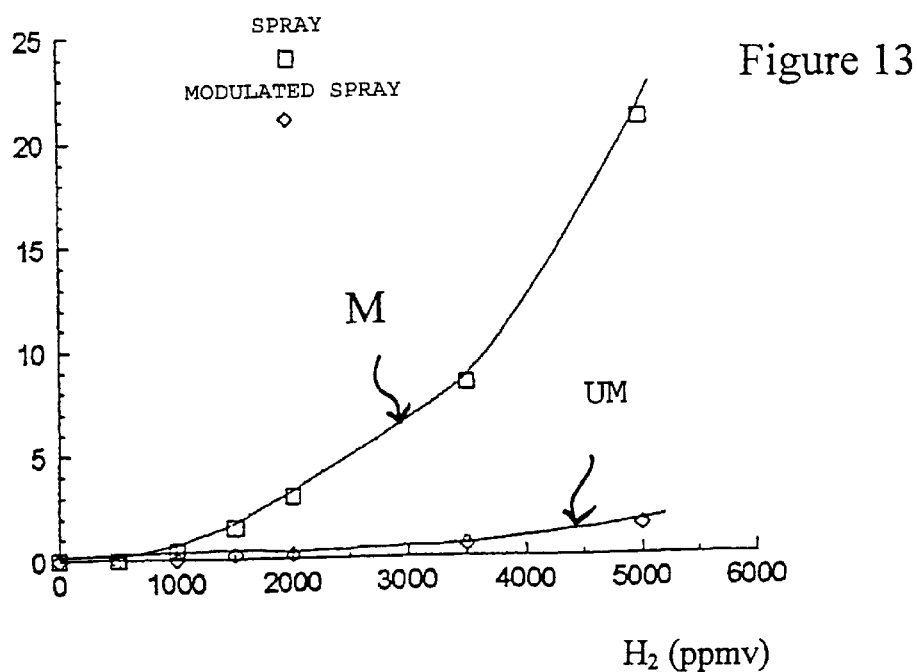
Figure 13

MODULATED SPRAY MIG WELDING PROCESS AND DEVICE

FIELD OF THE INVENTION

The invention relates to a process for the spray MIG-type welding, using inert shielding gases such as argon, helium and/or argon/helium mixtures, of, in particular, aluminum, aluminum alloys and stainless steels, making it possible to improve the quality and compactness of the weld beads.

BACKGROUND OF THE INVENTION

Currently, the most widely used process for welding aluminum and its alloys is the TIG (Tungsten Inert Gas) process which makes it possible to obtain weld beads whose quality and compactness are superior to those obtained using MIG (Metal Inert Gas) processes.

However, the TIG process cannot be regarded as being completely satisfactory as it results in welding speeds which are markedly less than those of MIG processes and therefore results in lower productivity.

In fact, the compactness problem (porosity of the weld beads) stems from hydrogen ($H_2$) having a high solubility in the molten metal.

In other words, the formation of pores by the incorporation of hydrogen is greater the higher the temperature of the material is above its melting point. By way of example, the curve of the solubility of hydrogen in pure aluminum as a function of the temperature of the metal is given in FIG. 1.

In welding, there are conventionally several sources of hydrogen, generally contaminants, such as hydrocarbons (greases, oils, etc.) or water vapour, present on the workpieces to be welded and/or on the wire, the moisture present in the pipes and the gas bottle or bottles, the air inlets or leaks in the fittings connected to the gas pipes and internal condensation occurring in the welding nozzle.

During the welding operation, these various contaminants dissociate in the electric arc, giving, in particular, hydrogen which dissolves immediately in the pool of molten metal and the droplets in the welding arc.

Next, the convection movements in the pool of molten metal transport the liquid which is saturated with hydrogen into the cooler regions of molten metal, thus resulting in the formation of pores during the process of solidification of the metal by cooling.

The incorporation or loading of hydrogen is, according to the Sievert law, proportional to the square root of the hydrogen partial pressure above the pool of molten metal.

In order to minimize this problem, the following are generally carried out:

- a pretreatment of the workpieces to be welded, such as degreasing, brushing or scraping, followed by subsequent storage for a short time of the workpieces protected from the aforementioned contaminants until they are actually welded;
- storage and use of the filler metal (wire) in a sealed, inerted and heated pay-out;
- choice of electrical parameters making it possible to avoid turbulence in the gaseous shielding with wet-air ingress, in particular those for maintaining a short and controlled arc length;
- choice of welding position conductive to degassing; and/or
- choice of welding speed suitable for favorable removal of the dissolved gases (degassing of the liquid metal).

However, it will be readily understood that these precautions are very restrictive and, in some cases, result in an appreciable increase in the overall cost of the welding process.

Another technique consists of using a filler metal containing microalloys, such as cobalt, which are intended to increase the number of nucleation sites, thus reducing the size of the pores contained in the weld bead. However, this technique does not reduce the overall porosity of the bead and as a result its quality is improved only slightly, if at all.

Furthermore, another known method is agitation of the welding pool, either by direct mechanical agitation, such as by vibration, or by applying electromagnetic fields external to the welding circuit. Thus, a direct-current TIG welding process, with a negative-polarity electrode and with or without a filler metal, has already been described which employs electromagnetic agitation by applying an alternating external magnetic field perpendicular to the workpieces to be welded to each other. However, the results obtained show that, at a frequency of 15 Hz, the agitation causes higher porosity than without an electromagnetic field.

Moreover, document U.S. Pat. No. 3,409,756 teaches a spray-type arc welding process employing periodic variations of the arc power between a high value and a low value, for example between 18,600 and 12,500 watts.

On the other hand, document U.S. Pat. No. 3,956,610 discloses a process for welding ferrous metals, steels and non-ferrous alloys employing periodic variations of the electric current delivered to the electrode.

Document EP-A-0,607,819 describes a pulsed-arc MAG (Metal Active Gas) welding process with an oxygen gas flow for welding galvanized materials, such as zinc. This document therefore seeks to solve a technical problem different to that of the present invention, namely that of avoiding contamination of the weld by zinc vapour forming at the time of welding.

Furthermore, a pulsed MIG or TIG welding process has also been described which employs large variations in the welding current so as to obtain a refinement with a different orientation of the structure of the metal deposited.

Another document U.S. Pat. No. 5,508,493, describes an MAG welding device making it possible to improve the appearance of the weld beads.

Document U.S. Pat. No. 4,273,988 relates to a pulsed-arc welding process with a shielding gas consisting of 60% helium, 25% argon and 15% carbon dioxide and with metal transfer in the spray mode at a frequency of 90 to 400 Hz.

Similarly, document U.S. Pat. No. 4,507,543 describes a pulsed-arc plasma or TIG welding process and document U.S. Pat. No. 4,749,841 relates to a pulsed-arc welding process with a shielding gas consisting of 16–25% helium, 1–4% carbon dioxide and the balance being argon.

Furthermore, document EP-A-422,763 describes a pulsed MIG welding process, especially for motor-vehicle parts, with a shielding gas consisting of argon containing from 2 to 5% oxygen.

However, none of these known processes makes it possible to solve the problem posed, namely to obtain really effective degassing of the gaseous impurities liable to contaminate the pool of molten metal, in particular diffusible hydrogen, and therefore does not result in joints or weld beads whose appearance and quality are improved and compatible with stringent industrial requirements.

SUMMARY OF THE INVENTION

The object of the present invention is therefore to solve the aforementioned problem, i.e. to improve the processes for welding aluminum and its alloys, by providing a modulated spray MIG welding process which:

does not have the above-mentioned drawbacks;

makes it possible to obtain effective degassing of at least most of the diffusible hydrogen liable to be in the pool of molten metal, and thus to improve the appearance and quality of the weld beads considerably;

results in effective welding of workpieces, especially those made of aluminum and its alloys;

is easy to employ and is less expensive than the conventional processes on an industrial scale; and can be used in both manual welding and automatic welding.

The present invention therefore relates to a process for the MIG welding, in spray mode, of, in particular, aluminum, aluminum alloys or stainless steels, in which the current is modulated at a modulation frequency of less than 60 Hz, preferably in the range from 10 to 50 Hz, preferably in the range from approximately 15 to 39.5 Hz, more preferably in the range from approximately 25 to 35 Hz and advantageously at least approximately 30 Hz.

Depending on the case, the process comprises one or more of the following characteristics:

the modulation background time is, depending on the wire speed, between 2 ms and 20 ms, preferably between 4 ms and 15 ms (ms standing for millisecond), and more preferably in the range 5 ms to 12 ms;

the current pulse has a waveform chosen from square, sinusoidal, triangular, trapezoidal and rectangular waveforms and combinations thereof, preferably a square or rectangular waveform;

the current pulse is applied to a wire whose diameter is at least 0.8 mm and preferably from approximately 1 mm to approximately 1.6 mm;

the welding speed is at least 1 cm/min. and preferably less than 5 m/min., and preferably in the range 20 cm/min. to 1 m/min.;

it furthermore comprises a regulation of the arc length, based on a reference measurement obtained from the peak time and/or the background time by varying the peak current and/or the background current, the arc length preferably being between 5 and 30 mm, preferably between approximately 10 and 20 mm;

it furthermore comprises maintaining a minimum current difference between the peak current and the background current of at least 30 A and preferably at least approximately 100 A, preferably from 130 to 250 A;

it is carried out under a flow of a shielding gas chosen from helium, argon and mixtures thereof, the gas optionally furthermore containing carbon dioxide ($CO_2$) and/or oxygen ($O_2$) in small amounts, i.e. in a proportion of less than 2%, preferably less than 1.6% or even less than 1%;

a meltable welding wire is melted so as to transfer droplets of molten metal in spray mode, the speed of the welding wire being from 1 to 20 m/min., preferably from 3 to 13 m/min.;

the intensity of the background current (Ib) is between 20 and 60 A, preferably approximately 30 A;

the intensity of the high current or peak current ($I_p$) is between 150 A and 350 A, preferably between approximately 190 A and 310 A;

the mean intensity ($I_m$) of the current is between 100 A and 300 A, preferably between approximately 105 A and 280 A; and the rate of detachment of the metal droplets from the melting of the meltable wire is between 200 and 700 droplets/s, the metal being transferred only when the current is at its peak.

The invention also relates to a device, in particular a welding generator, capable of implementing the abovementioned process, which comprises means making it possible to modulate the current at a modulation frequency of less than 60 Hz with a modulation background time of between 2 ms and 20 ms and means making it possible to maintain a minimum current difference between the peak current and the background current of at least 30 A, and to the use of such a device in an operation of welding a workpiece comprising at least one part made of aluminum or aluminum alloy, carbon steel or stainless steel.

In other words, a welding generator according to the invention comprises current modulation means making it possible to modulate the current at a modulation frequency of less than 60 Hz; and means for controlling the modulation background time, making it possible to maintain a modulation background time of between 2 ms and 20 ms.

In addition, a generator according to the invention may furthermore comprises:

means for adjusting the current pulse, making it possible to obtain a current pulse of a defined waveform chosen from square, sinusoidal, triangular trapezoidal and rectangular waveforms and combinations thereof;

means for controlling the arc length, making it possible to control the arc length based on a reference measurement obtained from the peak time and/or the background time varying the peak current and/or the background current; and/or current control means, making it possible to maintain a minimum current difference between the peak current and the background current of at least 30 A and preferably at least approximately 100 A.

The invention furthermore relates to a component made of aluminum, aluminum alloy, carbon steel or stainless steel comprising a weld which can be obtained by the process described above.

According to another aspect, the invention also relates to an item of equipment, i.e. a structure or a component, for the chemical or petrochemical industry, such as a container or an apparatus, for rail, sea, air, road or space transport, such as a boat or a motor vehicle, or for the electronic, nuclear or agrochemical industries, comprising at least one weld which can be obtained by the process of the invention or comprising at least one component comprising a weld which can be obtained by the process of the invention.

Furthermore, the invention also relates to a process for the MIG welding, in spray mode, of, in particular, aluminum, aluminum alloys or stainless steels with the use of gas shielding by means of a gas or a gas mixture containing at least one major gaseous component chosen from argon and helium, and, optionally, at least one minor gaseous component chosen from oxygen and carbon dioxide, in which:

gas shielding is used which contains at least 90% (by volume) of at least one major gaseous component and at most 1.95% (by volume) of at least one minor gaseous component, preferably from 0.01% to 1.80% of the at least one minor gaseous component, in particular from approximately 0.5% to 1.6% of oxygen; and the current is modulated at a modulation frequency of less than 60 Hz with, preferably, a modulation background time of between 2 ms and 20 ms. Preferably, the modulation frequency is in the range from 10 to 50 Hz, preferably in the range of approximately 15 to 39.5 Hz and advantageously is at least 30 Hz.

Preferably, the shielding gas or gas mixture contains less than 1.6% oxygen and carbon dioxide, more preferably less than 1% oxygen and carbon dioxide.

The invention will now be described in greater detail with reference to the appended Figures,

BRIEF DESCRIPTION OF THE DRAWINGS wherein:

FIGS. 7–9 are graphical representations of results obtained from studies of the modulation frequencies for background times;

FIGS. 12 and 12a–12d are diagrammatical representations of the effect of the transfer mode on the degree of porosity; and FIG. 13 is a graphical representation of the effect of contaminating hydrogen in the shielding flow on the degree of porosity.

DETAILED DESCRIPTION OF THE INVENTION

The following examples are given by way of illustration and are not intended to be construed as limiting.

EXAMPLES

The welding conditions employed according to the invention rely on a current mode of the spray type, to which a current modulation may or may not be applied in the generator, depending on the case.

The spray mode is the most conductive to contamination of the droplets and of the molten metal, because of a long arc length, significant transfer of metal and a high surface area, hence a pool of molten metal which is more easily contaminated and sensitive to porosity.

In order to confirm the effectiveness of the process of the invention, various comparative tests were carried out, in which weld beads were intentionally contaminated with hydrogen. The welds are produced by means of a welding process which was either in normal spray mode without current modulation, i.e. as taught by the prior art, or in modulated spray mode, i.e. according to the present invention.

Contamination by hydrogen is done using several methods, namely by direct contamination of the shielding gas (argon):

by moisture (water vapour), so as to obtain a shielding gas polluted by at least 100 ppmv of water (ppmv standing for parts per million by volume). The dosage is obtained by mixing a gas saturated with humidity by passage through a humidifier (flow rate: 5 l/min.) with dry gas (flow rate: 20 l/min.), the water content being controlled by means of a commercially available electrolytic hygrometer; or by gaseous hydrogen, from a "master" bottle containing an argon/hydrogen mixture, for example the Ar/2.5% $H_2$ mixture sold by Air Liquids under the tradename NOXAL 2™.

The weld beads thus obtained are analyzed by radiographic testing (compactness) and/or visual and macrographic examination (profile and interface of the additional thicknesses).

More specifically, the pores examined are evaluated at three different equal-sized sites in the weld bead obtained in spray mode with current modulation (sites A', B', C') and without modulation (sites A, B, C) and these pores are grouped into three categories (i), depending on whether their size is less than 0.5 mm (i=1), between 0.5 and 1 mm (i=2) or greater than 1 mm (i=3).

The number of pores ($N_i$) for each of these three categories and for each site in the weld bead is then obtained, from which one determines a final average radiographic rating ($N_f$) from the following formula:

$$N_f = \tfrac{1}{2}N_1 + N_2 + 2N_3$$

where $N_1$, $N_2$ and $N_3$ are the averages of the numbers of pores in the three sampling points (sites) in the case of categories 1, 2 and 3, respectively.

From that, the apparent blowhole area ore pore area relative to the area of the weld bead is determined (for example, over an area of approximately 1500 mm²).

The ratio of the apparent blowhole area to the bead area allows the results obtained to be compared with the specification of NF A89.220 (Class E criteria) ore ISO 10042 standards.

Figure 1:
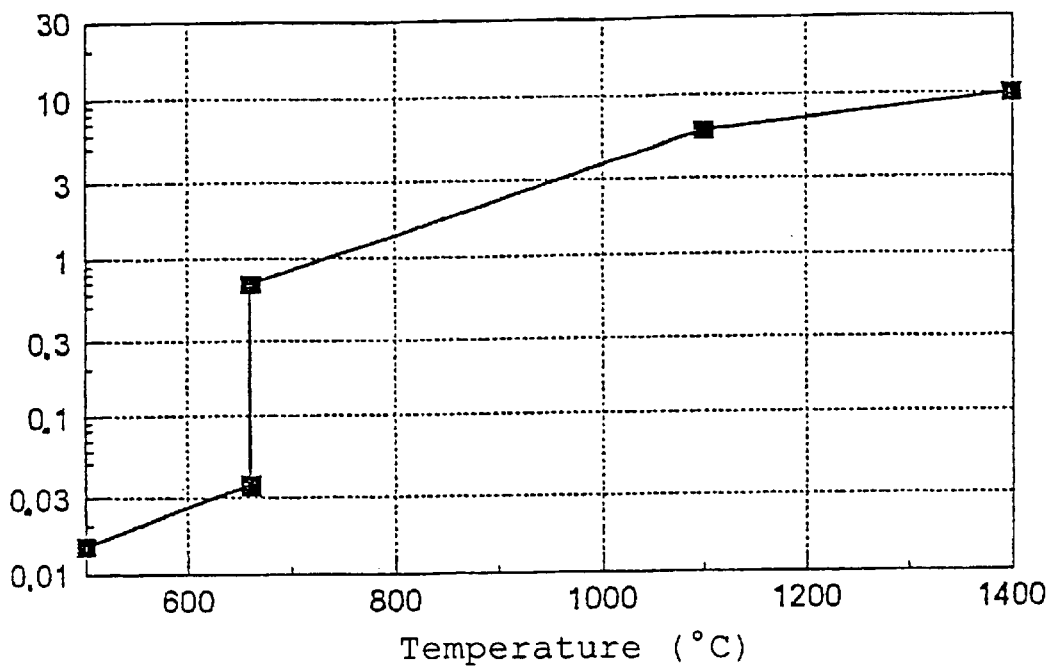
FIG. 1 is a graphical representation of the solubility of hydrogen in pure aluminum as a function of the temperature of the metal.
Figure 2:
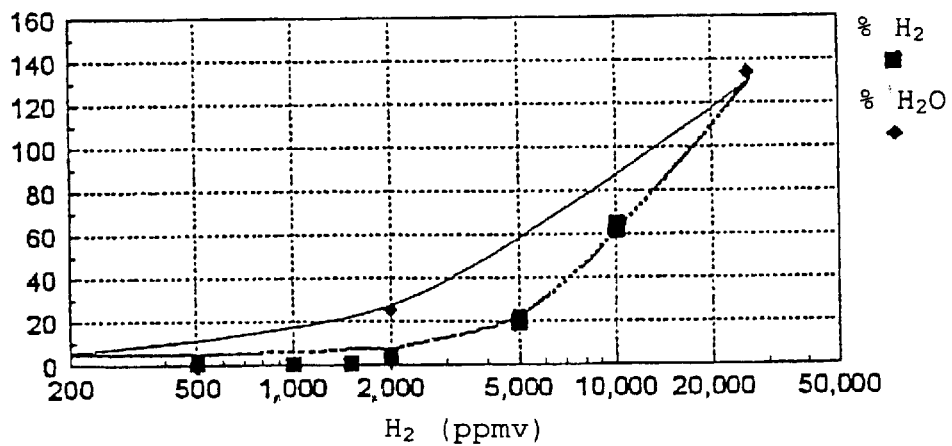
FIG. 2 shows the pore area or blowhole area produced depending on whether the contamination of the molten metal is produced by gaseous hydrogen or by water vapor.

By way of illustration, FIG. 2 shows the pore area $S_t$ (in mm²) or blowhole area produced depending on whether the contamination of the molten metal is produced by gaseous hydrogen ($H_2$) or by water vapour ($H_2O$). It may be seen that it is necessary to use a contaminated gas having a hydrogen content (8500 ppmv) 2 to 2.5 times greater than that of water (approximately 4000 ppmv) in order to obtain an equivalent result, for example a pore area ($S_t$) equal to 50 mm². The pores thus formed, due to the contamination of the molten metal by hydrogen, are representative of contamination in an industrial environment, both inn terms of their number and their size.

Figure 3:
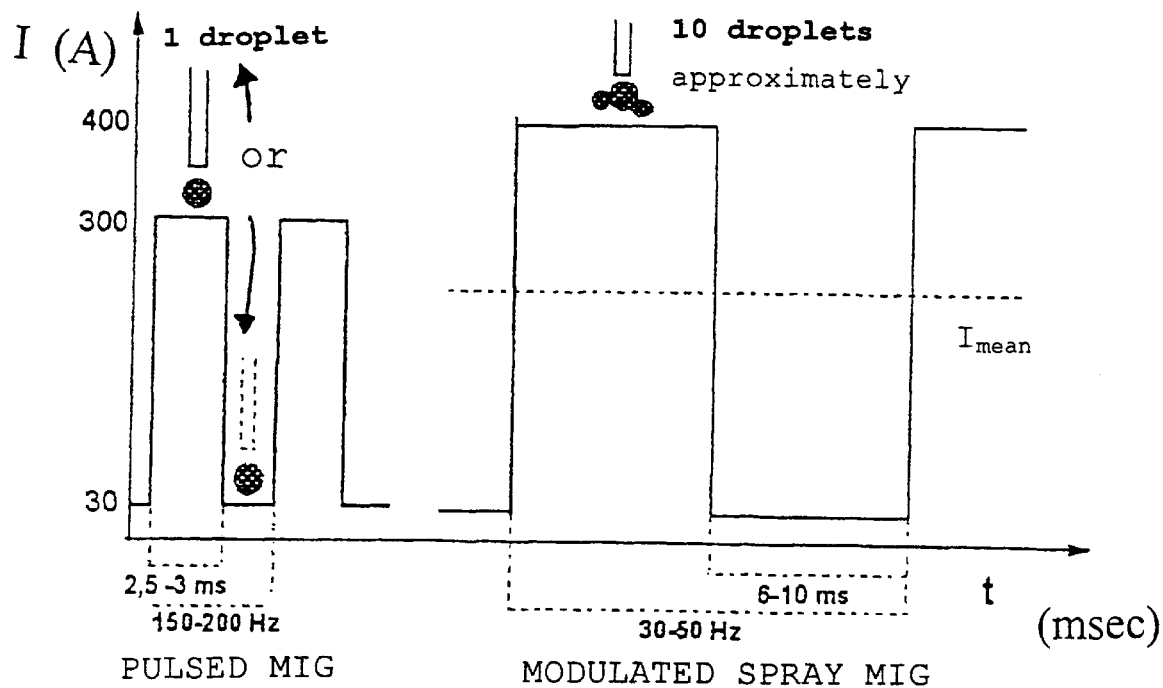
FIG. 3 is a diagrammatical representation comparing the modulated current pulse of the present invention with a conventional pulsed current.

Furthermore, as shown diagrammatically in FIG. 3, the modulatd current pulse (hereafter called modulated spray MIG) used according to the invention is centred on the mean current ($I_{mean}$) in the spray mode and is distinguished from that of a conventional pulsed current (hereafter called pulsed or unmodulated MIG) by the number of droplets of molten metal and by the time at which they are detached. In fact, in pulsed MIG welding, a single metal droplet is usually detached at the peak or at the trough of each current pulse, while in modulated spray MIG welding several droplets are detached only at the peak of each pulse.

The specimens welded in the comparative examples below by means of the modulated or unmodulated pulse are aluminum plates 10 mm×100 mm×500 mm in size, one half of the length of which is welded using an unmodulated spray MIG process and the other half of the length of which is welded using a modulated spray MIG process.

The modulated spray current is generated by a conventional-type synergic generator associated with a function generator making it possible to deliver pulses, especially of a square, rectangular, triangular or sinusoidal waveform, at a frequency of 20 to 400 Hz and with an amplitude corresponding to that of the welding generator.

Example 1: The Effect of the Pulse Waveform

Figure 4:
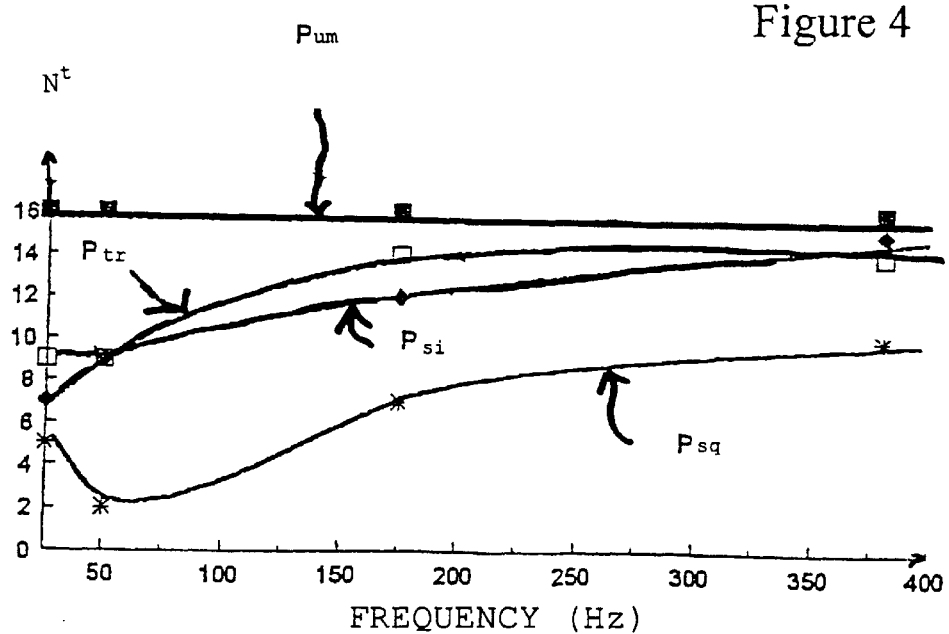
FIG. 4 is a graphical representation of the effect of the modulation pulse waveform on the formation of porosity.

The effect of the modulation pulse waveform on the formation of porosity, and therefore on the effectiveness of the modulation used in modulated spray mode, is shown diagrammatically in FIG. 4.

More specifically, FIG. 4 shows the radiographic rating ($N_t$) obtained as a function of the modulation frequency adopted for square ($P_{sq}$), sinusoidal ($P_{si}$) and triangular ($P_{tr}$) waveform pulses and, by way of comparison, without any modulation, i.e. for an unmodulated pulse ($P_{um}$).

It may be seen that the current modulation waveform has a marked effect on the elimination of porosity up to a frequency of about 150 Hz, approximately. Above a frequency of 150 Hz, there is a current modulation effect but it is generally less significant.

Among the various different pulse waveforms, it is a square pulse ($P_{sq}$) which gives the most effective degassing (evolution of dissolved hydrogen) from the pool of molten metal. Sinusoidal ($P_{si}$) and triangular ($P_{tr}$) pulses, meanwhile, give good results and are similar to each other.

It is apparent from this example that the square waveform pulse is preferred in modulated spray MIG welding.

Example 2: The Effect of Frequency

This Example 2 is similar to Example 1, but this time aims to demonstrate the existence of a preferred frequency range for modulated spray MIG welding.

Figure 5:
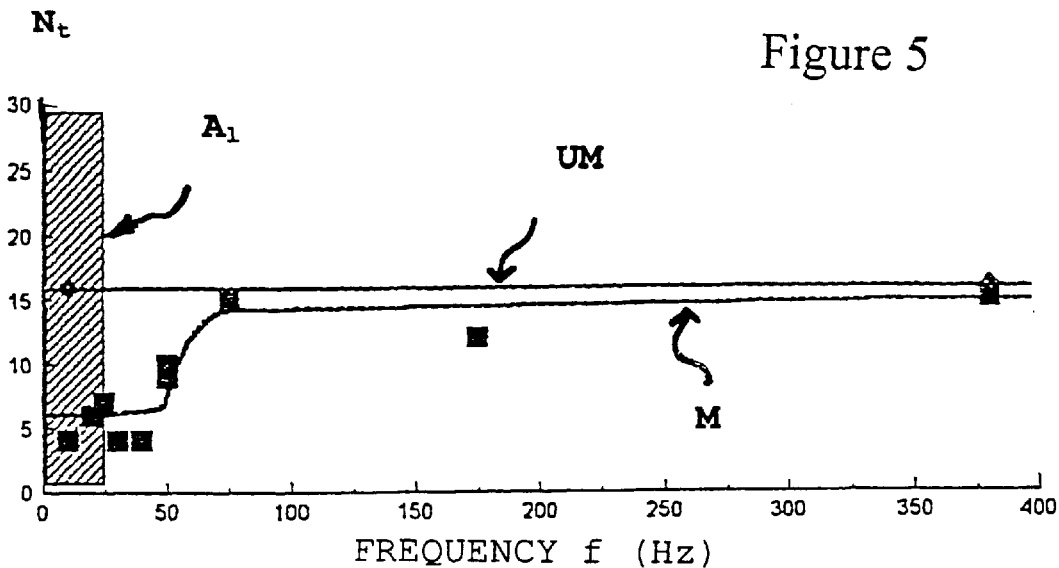
FIG. 5 is a graphical representation of the effect of the modulation pulse frequency on the formation of porosity.

More specifically, the effect of the modulation pulse frequency on the formation of porosity is shown diagrammatically in FIG. 5, in which the radiographic rating ($N_t$) obtained is given as a function of the modulation frequency adopted in spray MIG welding for a modulated square pulse (M) and, by way of comparison, for an unmodulated spray pulse (UM) for a 200 A current.

The results obtained are in agreement with those obtained in Example 1, but it is observed, however, that the effectiveness of the modulation decreases much more rapidly above 50 Hz than that which may be seen in FIG. 4.

The current modulation in spray MIG welding seems to be truly effective for values of less than or equal to approximately 60 Hz, preferably less than or equal to approximately 50 Hz, but greater than a low frequency limit ($A_1$) below which the arc becomes unstable (hatched region in FIG. 5).

Example 3: Background Time/Frequency Relationship

Figure 6:
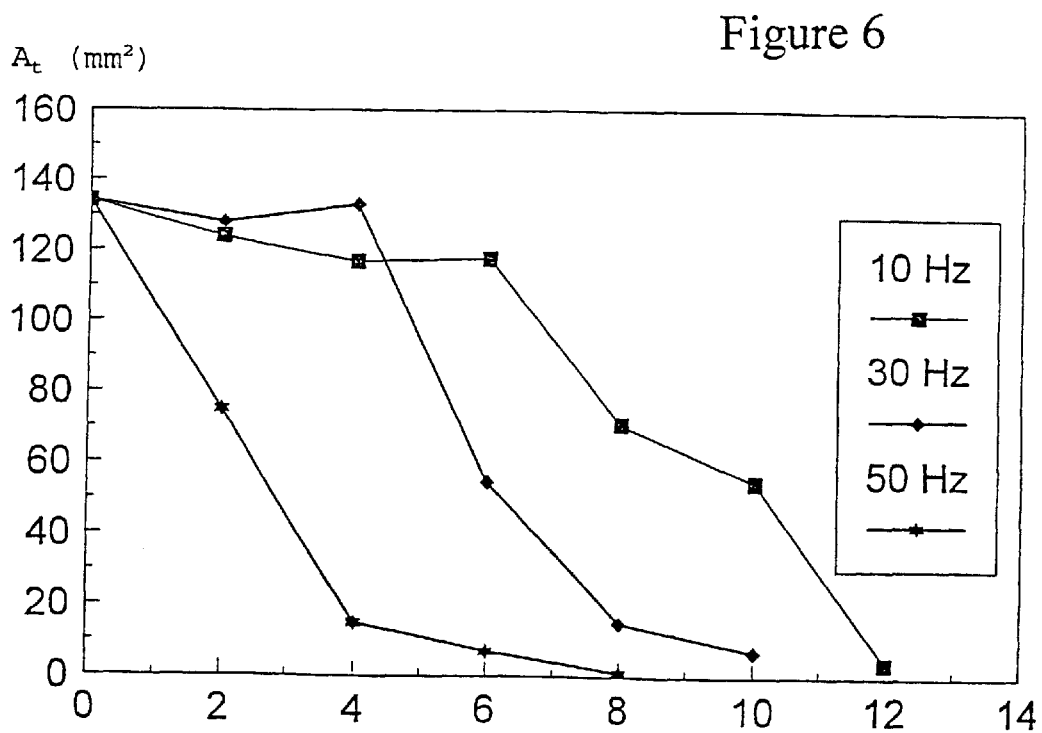
FIG. 6 is a graphical representation of the effect of the background time of the modulated signal on the reduction of porosity.

The effect of the background time of the modulated signal on the reduction of porosity was studied and is shown in FIG. 6 for three different frequency levels, namely: 10 Hz, 30 Hz and 50 Hz, for a 1.2 mm wire of the AG5 type, a welding speed of 35 cm/min. and a wire speed of 12.5 m/min.

It may be seen that a frequency of 50 Hz gives an optimum background time effect, and therefore a low degree of porosity (pore area: $A_t$ in mm$^2$) above a background time of 8 ms, whereas for a frequency of 30 Hz this optimum beneficial effect appears only for a background time of greater than 10 ms and, for a frequency of 10 Hz, this optimum beneficial effect appears only for a background time of greater than approximately 12 ms.

In fact, the increase in the duration of the background time probably causes a rapid increase in the peak modulation current and, consequently, large variations in the arc plasma pressure and magnetic field, which variations are sufficient to allow effective agitation of the pool of molten metal and degassing of the latter. The agitation of the pool of molten metal may be manifested by oscillations which may or may not be in resonance with the current variations.

In light of these results, the modulation frequencies between 10 Hz and 50 Hz have been studied in greater detail, for a 5086-type aluminum alloy, for background times of between 8 and 12 ms and for wire speeds ($V_{wire}$) in modulated spray MIG mode from 10 m/min. to 12.5 m/min.

The results obtained with a synergic generator with modified EPROM are shown diagrammatically in FIGS. 7 to 9, which correspond to wire speeds of 10 m/min., 11 m/min. and 12.5 m/min., respectively.

In the case of the aluminum alloy studied, it is therefore clear that background times of 10 ms and 12 ms make it possible, on the one hand, to obtain the lowest degree of porosity ($A_t$), this being so whatever the welding speed in question, and have, on the other hand, a beneficial and constant effect on the degree of porosity above a frequency 10 Hz and up to a frequency of 30 Hz. These results confirm those obtained previously.

Example 4: The Effect of Welding Speed.

The purpose of this example is to study the effect of the welding speed ($V_{weld}$) on the degassing of the pool of molten metal, the metal being a 5086-type aluminum alloy.

The operating parameters are as follows: a 480 TRS-type synergic generator sold by La Soudure Autogène Française, a TM 700-type welding torch sold by La Soudure Autogène Française and fitted with a 30 wire diameter nozzle, a 1.2 mm diameter NERTALIC™ 30 wire sold by La Soudure Autogène Francaise, a wire speed ($V_{wire}$) of 12.5 m/min., a current of 216 A, a voltage of 22.6 V, artificial contamination with 2000 ppmv of hydrogen and, depending on the case, a current modulation with a background time of 10 ms and a frequency of 30 Hz.

Figure 10:
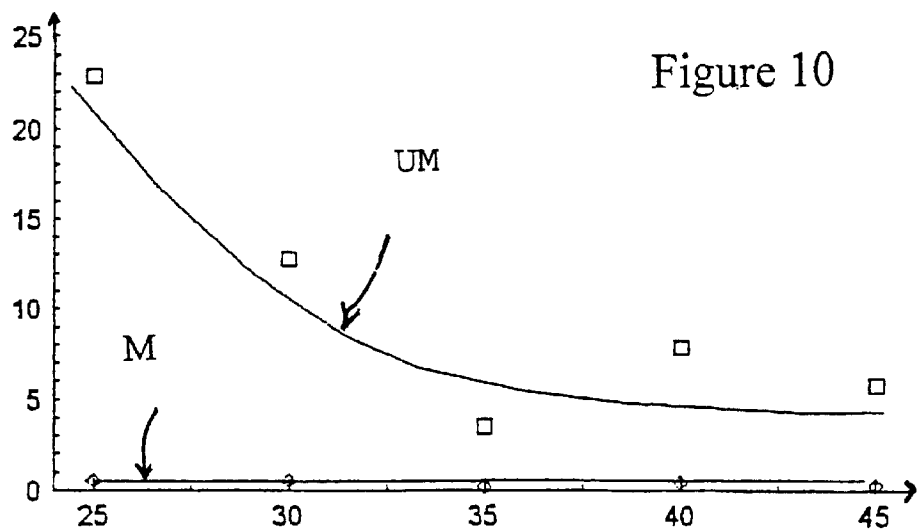
FIG. 10 is a graphical representation of the effect of welding speed on a modulated and unmodulated pulsed current.

As may be seen in FIG. 10, for a welding speed ($V_{weld}$) of 25 to 45 cm/min., welding using the modulated spray MIG technique (M) allows more effective degassing of the molten metal, and therefore better compactness of the weld bead, to be obtained than unmodulated, i.e. pulsed, spray MIG welding (UM).

The agitation arising from the current modulations modifies the solidus-liquidus interface of the pool of molten metal and its advance not only in the axial direction of the weld bead but also in the thickness direction.

As a result, in certain cases there is a refinement of the solidification structure and better compactness of the weld bead, despite the artificial contamination of the filler metal and of the molten pool with hydrogen (2000 ppmv in argon).

Example 5: The Effect of Wire Speed

The aim of this example is to study the effect of the wire speed ($V_{wire}$) on the degassing of the pool of molten metal, the metal being a 6061-type aluminum alloy.

The operating parameters used are as follows: a generator, a torch with nozzle and a welding wire which are similar to those in Example 4, a welding speed ($V_{weld}$) of 30 cm/min., a current of 220–250 A, a voltage of 22.6 V, artificial contamination with hydrogen of 1500 ppmv and, depending on the case, a current modulation with a background time of 10 ms and a frequency of 30 Hz.

Figure 11:
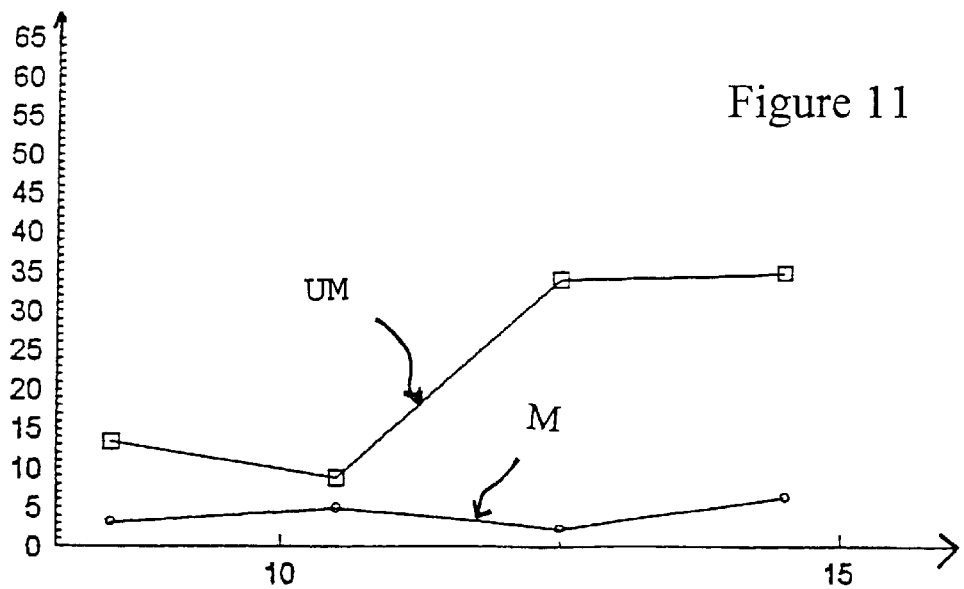
FIG. 11 is a graphical representation of the effect of wire speed on a modulated and unmodulated pulsed current.

As may be seen in FIG. 11, for a wire speed ($V_{wire}$) of approximately 12 to 14.5 m/min., modulated spray MIG welding (M) again makes it possible to obtain more effective degassing of the molten metal, and therefore better compactness of the weld bead, than unmodulated spray welding (UM).

This range of wire speeds ($V_{wire}$) corresponds substantially to that of the spray mode from short-arc spray mode to long-arc spray mode.

Furthermore, it may also be seen that the pore density increases with the arc voltage associated with a greater wire speed. This density increase may be mainly explained by the appearance of droplets of molten metal (wire) which are finer and more numerous for a longer path in the electric arc, and therefore a greater loading with hydrogen or with moisture.

Despite this, the current modulation applied remains very beneficial, allowing effective degassing of the molten metal; moreover, the effect of the modulation does not seem to depend on the wire speed.

Example 6: The Effect of Transfer Mode

The aim of Example 6 is to study the effect of the transfer mode on the degree of porosity, i.e. on the degassing of the pool of molten metal, for the following transfer modes: short-arc spray (SAS), long-arc spray (LAS), pulse (PM) and modulated long spray (MLS).

The operating conditions and the results obtained are given in Table I below.

The regions where the width (L), the height (H) and the penetration (P) of the weld are measured are shown in detail in FIG. 12.

TABLE I

| Test No. | Transfer mode | L (mm) | H (mm) | P (mm) | Current (A) | Voltage (V) | Appearance of the bead |
|---|---|---|---|---|---|---|---|
| 1 | LAS | 13 | 3.6 | 4.16 | 210 | 23 | FIG. 12a |
| 2 | SAS | 11.6 | 3.7 | 3.3 | 190 | 19 | FIG. 12b |
| 3 | PM | 13.6 | 3.3 | 4.6 | 194 | 21 | FIG. 12c |
| 4 | MLS | 14.3 | 3.6 | 5.5 | 204 | 21 | FIG. 12d |

Examination of the appearance of the weld beads obtained makes it possible to conclude that the SAS mode produces a degree of porosity which is very much less than that of the LAS mode (cf. ref. p in FIG. 12a to 12d), which tends to show that the loading of the molten pool with hydrogen takes place mostly in the electric arc by means of many fine metal droplets, and with a longer travel time, and also by direct contamination of the pool of molten metal with hydrogen.

That aside, the degrees of porosity obtained in SAS and PM modes are approximately equivalent, but nevertheless higher than those obtained in MLS mode.

With regard to the geometry of the weld beads, it is apparent from FIGS. 12a to 12d that in MLS mode (FIG. 12d), the penetration (P) of the weld is much greater because of the high currents of the stronger modulations, and a width (L) that is greater than the added height.

Furthermore, these results clearly show that the agitation of the pool of molten metal occurs both in the width direction and in the thickness direction of the weld bead.

The reduction in the degree of porosity and the improvement in the profile of the weld bead combine and probably result in better fatigue strength of such joints and therefore of structures joined together by means of welds produced by a modulated spray MIG welding process.

Example 7: The Effect of the Proportion of Hydrogen

The aim of this example is to study the effect of the proportion of contaminating hydrogen in the shielding flow (in this case argon) on the degree of porosity when a modulated spray MIG welding process is used.

The operating parameters are as follows: the generator, torch and welding wire are similar to those in Example 4 and the spray mode is with modulation of the current (background time of 10 ms; frequency of 30 Hz) and, by way of comparison and reference, without current modulation.

Furthermore, the shielding gas (argon) is artificially contaminated with increasing amounts of hydrogen ranging up to 5000 ppmv. The aluminum alloy is of the 5086-type (10 mm).

The results obtained are shown in FIG. 13, where it is apparent that, even in the most unfavourable case, namely contamination of the argon by 5000 ppmv of hydrogen, the current modulation allows a degree of porosity of less than 0.007 to be obtained, which still complies with the requirements of Class E of the NFA 89.220 standard.

Comparable results to those obtained here with 5086-type aluminum alloys (10 mm in thickness) may be obtained with other aluminum alloys, such as especially 6061-type alloys.

Example 8: The Effect of the Current Difference Between the Peak Current and the Background Current The effect of the current difference ($\Delta I$) between the peak current (high current) and the background current (low current) of the modulated signal on the reduction in the degree of porosity has also been studied, for modulation frequencies of between 10 Hz and 50 Hz, for a 1.2 mm AG5-type wire, a welding speed of 35 cm/min. and a wire speed of 12.5 m/min.

In light of these results, the current difference ($\Delta I$) between the peak current (high current) and the background current for background time values of between 2 ms and 20 ms, preferably between 8 and 12 ms, in modulated spray MIG mode, must be at least 30 A, preferably at least 70 A and more preferably at least 100 A.

This is because, for a given wire speed, it is necessary to meet the following conditions when using the process, namely:

a background current ($I_{background}$) which is more or less constant and as low as possible in order to maintain a welding arc without metal transfer, a minimum peak current ($I_{peak}$) representative of a spray mode for well-established axial spray transfer.

This therefore means that a minimum current difference ($\Delta I$) must be respected in order to allow good metal transfer and good current modulation effectiveness, and therefore a good reduction in porosity.

In practice, in terms of controlling the parameters, based on a given wire speed ($V_{wire}$) (and therefore for a given $I_{mean}$), it is found that the value of the background time ($t_{background}$) determines the corresponding peak current ($I_{peak}$) and therefore directly determines the corresponding current difference ($\Delta I$), where:

$$\Delta I = I_{peak} - I_{background}.$$

Therefore, for a more or less constant background current ($I_{background}$), the more the background time ($t_{background}$) increases from 8 to 12 ms (see FIG. 6) the greater the difference ($\Delta I = I_{peak} - I_{background}$) becomes and the greater is its effect on the reduction in porosity, up to a maximum value of 10 to 12 ms for wire speeds ($V_{wire}$) of approximately 10 to 12.5 m/min. (see FIGS. 7, 8 and 9), above which speed the spray produced at peak current ($I_{peak}$) is too high and therefore is also associated with a corresponding arc voltage ($U_{arc}$) which is too high. This then causes direct external contamination of the droplets of molten metal in the welding arc.

It is also possible for too high an amplitude ($I_{peak} - I_{background}$) to have the opposite effect to that desired, i.e. a deleterious effect on the oscillations of the pool, especially excessive agitation of the pool and disturbances in its shielding.

Based on these results, it is then possible to establish, for a given frequency (for example 30 Hz) and for each wire diameter, curves of background time ($t_{background}$) as a function of wire speed ($V_{wire}$) making it possible to guarantee both an open welding operating range and an effective reduction in the degree of porosity.

Thus, for a current difference ($\Delta I$) of at least 30 A, it is seen that a low degree of porosity is obtained.

It should be furthermore noted that the process of the invention has the advantage of being a process operating in interrupted spray mode, that is to say that it transfers metal from the meltable wire to the weld joint only during the high part of the current pulse or while the peak current is flowing.

Thus, the background current or low current is merely a current for maintaining the arc without transfer of molten metal, something which makes it possible, moreover, to operate over a wider current variation between the background current and the peak current so as to obtain larger oscillations of the pool of molten metal forming the weld joint and therefore more effective degassing of the latter.

The spray-mode MIG welding process according to the invention may be applied, both in manual welding and in automatic welding, not only for welding any workpiece or component made of aluminum, aluminum alloy or stainless steel, but also for solving similar problems of molten-metal pool degassing, i.e. of weld joints, likely to exhibit porosity whose origin may be different from that of the porosity encountered in aluminum and aluminum alloys, for example in the case of the welding of carbon-steel sheets coated with paint primers or of oxidized sheets.

What is claimed is:

1. A MIG process for the welding, in spray mode, of aluminum, aluminum alloys or stainless steels, which comprises applying a current which is modulated at a modulation frequency of less than 60 Hz with a modulation background time of between approximately 2 ms and 20 ms.

2. The process according to claim 1, wherein the modulation frequency ranges from 10 to 50 Hz.

3. The process according to claim 2, wherein the modulation frequency ranges from approximately 25 to 35 Hz.

4. The process according to claim 1, wherein the modulation background time is between approximately 5 ms and 12 ms.

5. The process according to claim 1, wherein the current pulse has a waveform selected from the group consisting of square, sinusoidal, triangular, trapezoidal, and rectangular waveforms, and combinations thereof.

6. The process according to claim 1, wherein the current pulse is applied to a meltable wire whose diameter is at least 0.8 mm.

7. The process according to claim 6, wherein the diameter ranges from about 1 mm to about 1.6 mm.

8. The process according to claim 1, wherein the welding speed is at least 1 cm/min.

9. The process according to claim 8, wherein the welding speed is at most 5 m/min.

10. The process according to claim 8, wherein the welding speed ranges from approximately 20 cm/min to approximately 1 m/min.

11. The process according to claim 1, further comprising regulating the arc length based on a reference measurement obtained from at least one of the peak time and the background time by varying at least one of the peak current and the background current.

12. The process according to claim 1, further comprising maintaining a minimum current difference between the peak current and the background current of at least 30 A.

13. The process according to claim 12, wherein the minimum current difference between the peak current and the background current is at least approximately 100 A.

14. The process according to claim 1, wherein the process is carried out under a flow of a shielding gas selected from the group consisting of helium, argon and mixtures thereof, said gas optionally further containing at least one of carbon dioxide and oxygen.

15. A MIG process for welding, in spray mode, of aluminum, aluminum alloys or stainless steels, with a shielding gas or gas mixture containing at least one major gaseous component selected from the group consisting of argon, helium and mixtures thereof, and at least one gaseous component selected from the group consisting of oxygen and carbon dioxide, which comprises:

using a gas shield which contains at least 90% by volume of at least said major gaseous component, and at most 1.95% by volume of at least said minor gaseous component; and applying a current which is modulated at a modulation frequency of less than 60 Hz.

16. The process according to claim 15, wherein the gas shield contains from 0.01 to 1.80% of oxygen as the minor gaseous component.

17. Welding device capable of implementing the MIG process according to claim 1, the device comprising means structured and arranged to modulate the current at a modulation frequency of less than 60 Hz, and means for maintaining a modulation background time of between 2 ms and 20 ms.

18. Welding generator, which comprises:

current modulation means for modulating the current at a modulation frequency of less than 60 Hz; and means for controlling the modulation background time and maintaining a modulation background time of between 2 ms and 20 ms.

19. The welding generator according to claim 18, further comprising means for adjusting the current pulse and for obtaining a current pulse of defined waveform selected from the group consisting of square, sinusoidal, triangular, trapezoidal and rectangular waveforms and combinations thereof;

means for controlling the arc length based on a reference measurement obtained from at least one of the peak time and the background time by varying at least one of the peak current and the background current; and current control means for maintaining a minimum current difference between the peak current and the background current of at least 30 A.

20. Component made of aluminum, aluminum alloy, carbon steel or stainless steel, comprising a weld obtained by the process according to claim 1.

* * * * *